(12) United States Patent
Dietlmeier et al.

(10) Patent No.: US 11,174,941 B2
(45) Date of Patent: Nov. 16, 2021

(54) METHOD AND CONTROL UNIT FOR OPERATING A MOTOR VEHICLE

(71) Applicant: ZF Friedrichshafen AG, Friedrichshafen (DE)

(72) Inventors: Matthias Dietlmeier, Friedrichshafen (DE); Michael Sohler, Isny (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/917,307

(22) Filed: Jun. 30, 2020

(65) Prior Publication Data

US 2021/0003216 A1    Jan. 7, 2021

(30) Foreign Application Priority Data

Jul. 1, 2019  (DE) ..................... 10 2019 209 593.3

(51) Int. Cl.
*F16H 61/12*   (2010.01)
*F16H 63/34*   (2006.01)
*F16H 63/48*   (2006.01)

(52) U.S. Cl.
CPC .......... *F16H 61/12* (2013.01); *F16H 63/3433* (2013.01); *F16H 63/3483* (2013.01); *F16H 63/48* (2013.01); *F16H 2061/1208* (2013.01); *F16H 2061/1224* (2013.01); *F16H 2061/1232* (2013.01); *F16H 2061/1288* (2013.01)

(58) Field of Classification Search
CPC ............... F16H 2059/683; F16H 61/12; F16H 2061/1208; F16H 2061/1224; F16H 2061/1232; F16H 2061/1288; F16H 63/3433; F16H 63/3483; F16H 63/48

See application file for complete search history.

(56) References Cited

U.S. PATENT DOCUMENTS

| | | | | |
|---|---|---|---|---|
| 5,696,679 A | * | 12/1997 | Marshall ................ | B60T 1/005 192/222 |
| 2010/0085082 A1 | * | 4/2010 | Katrak ................ | F16H 59/0217 327/20 |
| 2011/0203899 A1 | * | 8/2011 | Weifels ............... | F16H 63/3433 192/219.5 |
| 2018/0066755 A1 | | 3/2018 | Kimura et al. | |
| 2019/0003589 A1 | | 1/2019 | Haugg et al. | |
| 2020/0200268 A1 | * | 6/2020 | Davis ........................ | F16H 1/28 |

FOREIGN PATENT DOCUMENTS

| | | | |
|---|---|---|---|
| DE | 102017008143 A1 | 3/2018 | |
| DE | 102017211025 A1 | 1/2019 | |

* cited by examiner

*Primary Examiner* — Edwin A Young
(74) *Attorney, Agent, or Firm* — Dority & Manning, P.A.

(57) ABSTRACT

A method for operating a motor vehicle with a prime mover (1), a transmission (2), a driven end (14), and a parking lock system (19) is provided. A shift element (9) of the transmission (2) and a parking lock actuator (21) of the parking lock system (19) utilize a common pressure control. When the shift element (9) is actuated with the aid of a pressure control effecting an at least partial engagement of the shift element (9) and when the pressure control is less than a limiting value for holding the parking lock system (19) in the disengaged position, the method includes monitoring a parking lock sensor (23) to determine whether the parking lock sensor (23) detects a movement of the parking lock actuator (21) or a signal corresponding to the movement of the parking lock actuator (21) despite a parking lock detent (22) having been actuated for locking.

8 Claims, 5 Drawing Sheets

METHOD AND CONTROL UNIT FOR OPERATING A MOTOR VEHICLE

CROSS-REFERENCE TO RELATED APPLICATION

The present application is related and has right of priority to German Patent Application No. 10 2019 209 593.3 filed on Jul. 1, 2019, which is incorporated by reference in its entirety for all purposes.

FIELD OF THE INVENTION

The invention relates generally to a method for operating a motor vehicle. Moreover, the invention relates generally to a control unit for carrying out the method.

BACKGROUND

A drive train of a motor vehicle includes a prime mover and a transmission connected between the prime mover and a driven end. Typically, the transmission is an automated or automatic transmission including multiple shift elements, wherein the shift elements can be designed as form-locking shift elements as well as friction-locking shift elements.

In each engaged, force-locking gear of the transmission, a first number of the shift elements of the transmission is engaged and a second number of the shift elements of the transmission is disengaged with the aid of an appropriate pressure control of the particular shift element. Depending on the force-locking gear engaged in the transmission, the transmission converts rotational speeds and torques and, in this way, provides the available tractive force of the prime mover at the driven end.

Moreover, it is known from practical experience that a motor vehicle includes a parking lock system. Such a parking lock system is also referred to as a transmission parking lock and is utilized, in the engaged condition, for preventing the motor vehicle from unintentionally rolling away. A parking lock system includes a parking lock pawl, a parking lock actuator, a parking lock detent, and a parking lock sensor. The parking lock actuator is utilized for actuating the parking lock pawl in order to engage or disengage the parking lock system via the actuation of the parking lock pawl. The parking lock detent is utilized for locking and releasing the parking lock actuator. If a parking lock actuator is locked with the aid of the parking lock detent, the parking lock pawl cannot be actuated. With the aid of the parking lock sensor, a parameter of the parking lock system can be detected, in particular a movement of the parking lock actuator or a signal corresponding to the movement of the parking lock actuator.

DE 10 2017 211 025 A1 discloses a motor vehicle including a transmission parking lock and, therefore, a transmission including a parking lock system, wherein the parking lock actuator and a shift element of the transmission utilize a common supply of transmission oil and, therefore, a common pressure control.

DE 10 2017 008 143 A1 describes a method for operating a motor vehicle including a transmission with a parking lock system. In this case, a method is provided for diagnosing the functionality of an interlock or detent of a parking lock actuator designed as a parking lock piston. The method known from DE 10 2017 008 143 A1 is suitable for diagnosing the detent of the parking lock actuator for the case in which the position P Park is selected at a transmission selector lever.

SUMMARY OF THE INVENTION

Example aspects of the invention provide a new type of method and a control unit for operating a motor vehicle.

In an operating situation of the transmission, in which the shift element of the transmission that utilizes the common pressure control together with the parking lock actuator is actuated with the aid of a pressure control effecting an at least partial engagement of the shift element, monitoring is carried out to determine whether, for the case in which this pressure control is less than a limiting value for holding the parking lock system, due to the pressure control, in the disengaged position, the parking lock sensor detects a movement of the parking lock actuator or a signal corresponding to the movement of the parking lock actuator despite a parking lock detent having been actuated for locking. For the case in which a movement of the parking lock actuator or a signal corresponding to the movement of the parking lock actuator is detected, a faulty parking lock detent is inferred. However, for the case in which no movement of the parking lock actuator or no signal corresponding to the movement of the parking lock actuator is detected, a non-faulty parking lock detent is inferred.

Example aspects of the invention may be utilized for checking the parking lock detent of a parking lock system in which the parking lock actuator and a shift element of the transmission utilize a common pressure control. For the case in which the shift element of the transmission that utilizes the common pressure control together with the parking lock actuator is actuated in order to at least partially engage and, moreover, for the case in which, due to the pressure control, the parking lock system cannot be held in the disengaged position, a check is carried out to determine whether, despite the parking lock detent having been actuated for locking, the parking lock sensor detects a movement of the parking lock actuator or a signal corresponding to the movement of the parking lock actuator. If this is the case, a faulty parking lock detent is inferred. Otherwise, a non-faulty parking lock detent is detected. With the aid of example aspects the method, the check of the parking lock detent can take place both in the neutral position as well as in a driving position of the transmission for forward travel and for travel in reverse within a short time and, in fact, without a time disadvantage for the rest of the function sequence in the transmission.

For the case in which the transmission, starting from a park position with an engaged parking lock system, is transferred into a neutral position or a driving position for forward travel or travel in reverse, initially the shift element of the transmission that utilizes the common pressure control together with the parking lock actuator is actuated with the aid of a pressure control that at least partially engages this shift element and, moreover, disengages the parking lock system. Thereafter, for the case in which the parking lock system is disengaged and the parking lock detent is actuated for locking, the pressure control is reduced in such a way that the parking lock system can no longer be held in the disengaged position due to the reduced pressure control. Monitoring is carried out to determine whether, despite a parking lock detent having been actuated for locking due to the reduced pressure control, the parking lock sensor detects a movement of the parking lock actuator or a signal corresponding to the movement of the parking lock actuator and, depending thereon, a faulty or non-faulty parking lock detent is inferred. This example refinement is preferred for the case in which the transmission, starting from the park position, is transferred into the neutral position or into the driving position for forward travel or travel in reverse.

For the case in which the transmission assumes a neutral position, the shift element of the transmission that utilizes the common pressure control together with the parking lock actuator is actuated with the aid of a pressure control that at least partially engages this shift element but cannot hold the parking lock system in the disengaged position. Monitoring is carried out to determine whether, despite a parking lock detent having been actuated for locking due to the pressure control, the parking lock sensor detects a movement of the parking lock actuator or a signal corresponding to the movement of the parking lock actuator and, depending thereon, a faulty or non-faulty parking lock detent is inferred. This example refinement of the method is preferred in order to carry out the check of the parking lock detent when the transmission assumes the neutral position.

For the case in which the transmission assumes a driving position for forward travel or travel in reverse, the shift element of the transmission that utilizes the common pressure control together with the parking lock actuator is actuated together with further shift elements of the transmission, in each case with the aid of a pressure control that is necessary for a transmission of the torque presently to be transmitted. For the case in which this pressure control is less than the limiting value, monitoring is carried out to determine whether, despite a parking lock detent having been actuated for locking due to the pressure control, the parking lock sensor detects a movement of the parking lock actuator or a signal corresponding to the movement of the parking lock actuator and, depending thereon, a faulty or non-faulty parking lock detent is inferred. This example refinement of the invention is preferred for carrying out the check of the parking lock detent when the transmission assumes the driving position for forward travel or travel in reverse.

BRIEF DESCRIPTION OF THE DRAWINGS

Exemplary embodiments of the invention are explained in greater detail with reference to the drawings, without being limited thereto. Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
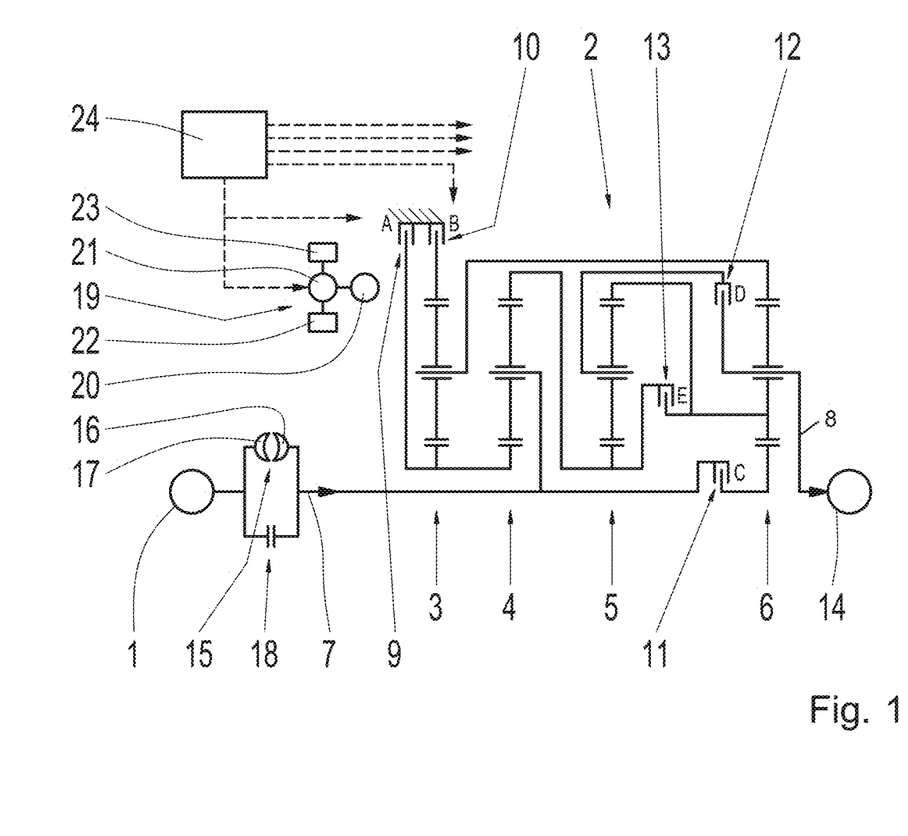
FIG. 1 shows an exemplary diagram of a drive train of a motor vehicle including an exemplary transmission.

FIG. 1 shows, in a highly schematic manner, an exemplary diagram of a drive train of a motor vehicle including an exemplary multi-stage automatic transmission 2. The drive train from FIG. 1 includes a prime mover 1, the automatic transmission 2, and a driven end 14, wherein the automatic transmission 2 is arranged in the power flow between the prime mover 1 and the driven end 14.

The automatic transmission 2 includes, by way of example, multiple gear sets 3, 4, 5, and 6 as well as multiple shift elements 9, 10, 11, 12, and 13 cooperating with the gear sets, wherein the two shift elements 9 and 10 are also referred to as shift elements A and B, respectively, and wherein the shift elements 11, 12, and 13 are also referred to as shift elements C, D, and E, respectively. The shift elements A and B as well as the shift elements C, D, and E are each friction-locking shift elements, namely brakes in the case of the shift elements A and B and clutches in the case of the shift elements C, D, and E.

Figure 2:
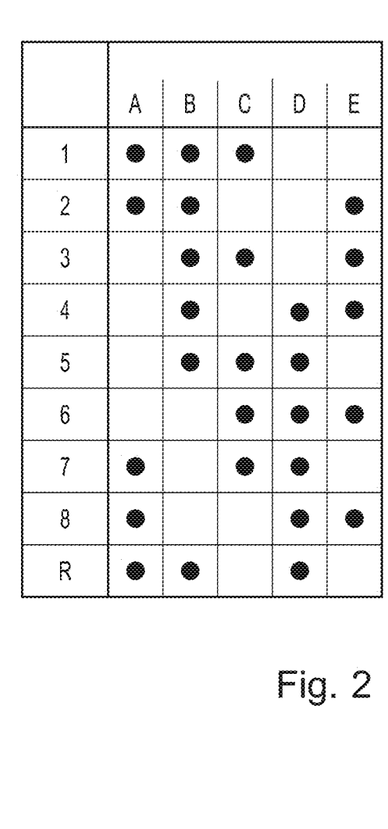
FIG. 2 shows a shift pattern of the transmission system from FIG. 1.

FIG. 2 shows a shift pattern of the automatic transmission 2 from FIG. 1. It is apparent from FIG. 2 that, with the aid of the transmission 2 from FIG. 1, a total of eight force-locking and, thereby, tractive force-transmitting forward gears and one force-locking and, thereby, tractive force-transmitting reverse gear can be made available. In each of these tractive force-transmitting gears, a defined first number of shift elements, namely three shift elements, is engaged, whereas a defined second number of shift elements, namely two shift elements, is disengaged in each tractive force-transmitting and, thereby, force-locking gear.

The shift elements that are engaged in the particular force-locking and, thereby, tractive force-transmitting gear are marked by a dot in FIG. 2. In the forward gear 1, the shift elements A, B, and C are engaged and, in the forward gear 2, the shift elements A, B, and E are engaged. In the reverse gear, the shift elements A, B, and D are engaged. The shift elements that are engaged in the forward gears 3, 4, 5, 6, 7, and 8 are also indicated in the shift pattern from FIG. 2.

FIG. 1 shows that the prime mover 1 is coupled to a transmission input shaft 7 and the driven end 14 is coupled to a transmission output shaft 8. Depending on the gear engaged in the transmission 2, the transmission 2 converts rotational speeds and torques and, in this way, provides the available tractive force of the prime mover 1 at the driven end 14.

A torque converter 15, as a hydrodynamic starting component, is connected between the prime mover 1 and the transmission input shaft 7 in the exemplary embodiment shown in FIG. 1. Such a torque converter 15 includes a turbine 16, wherein the turbine 16 is coupled to the transmission input shaft 7. Moreover, a torque converter 15 includes a pump 17 and a torque converter lockup clutch 18. A person skilled in the art addressed in this case is familiar with the configuration of such a torque converter.

Instead of a torque converter, a launch clutch can also be connected, as a starting component, between the prime mover 1 and the transmission input shaft 7.

A transmission-internal clutch can also act as a starting component.

As is apparent from the shift pattern from FIG. 2, in each force-locking and, thereby, tractive force-transmitting gear of the transmission 2, a first defined number N of the shift elements 9 through 13 is engaged and a second defined number M of the shift elements 9 through 13 is disengaged. It is apparent from FIG. 2 that N=3 shift elements are engaged and M=2 shift elements are disengaged in each force-locking and, thereby, tractive force-transmitting gear of the transmission 2.

Moreover, the transmission 2 from FIG. 1 includes a parking lock system 19 with a parking lock pawl 20, a parking lock actuator 21, a parking lock detent 22, and a parking lock sensor 23. Such a parking lock system 19 is also referred to as a transmission parking lock and prevents the motor vehicle from unintentionally rolling away. The parking lock pawl 20, which finally provides the function of the parking lock, can be actuated, namely engaged and disengaged, starting from the parking lock actuator 21. The parking lock actuator 21 is a hydraulically actuated piston. The parking lock actuator 21 can be locked and released by the parking lock detent 22. The parking lock actuator 21 can move only in the released condition of the parking lock detent 22. For the case, however, in which the parking lock detent 22 has been actuated for locking, a movement of the parking lock actuator 21 is to be blocked or impossible. The movement of the parking lock actuator 21 or a signal corresponding to the movement of the parking lock actuator 21 can be detected by the parking lock sensor 23.

In addition, FIG. 1 shows a hydraulic system 24. With the aid of the hydraulic system 24, a pressure control can be applied onto the shift elements 9 through 13 or A through E as indicated by the dashed arrows from FIG. 1. FIG. 1 shows that, in the exemplary embodiment shown, the shift element 9 or A designed as a brake and the parking lock actuator 21 utilize a common pressure control.

The shift element A from FIG. 1 and the parking lock actuator 21 utilize the common pressure control in such a way that a pressure control actuating the shift element A for locking also actuates the parking lock actuator 21 in order to disengage the parking lock pawl 20. A pressure control of the shift element A that effects an engagement of the shift element A therefore also effects a disengagement of the parking lock system 19, namely a disengagement of the parking lock pawl 20. Not every level of the pressure control of the shift element A that effects a merely partial engagement of the shift element A is suitable, however, for disengaging the parking lock pawl 20 or holding the parking lock pawl 20 in the disengaged position. Rather, the pressure control for the shift element A must be greater than a limiting value in order to disengage the parking lock system 19 or the parking lock pawl 20, and hold the parking lock pawl 20 in the disengaged position, due to the pressure control.

It is apparent from FIG. 2 that the shift element A is engaged in the forward gears 1, 2, 7, and 8 and in the reverse gear R. The shift element A is disengaged in the forward gears 3, 4, 5, and 6, however. The parking lock detent 22 is utilized for holding the parking lock system 19 or the parking lock pawl 20 in the disengaged position, in particular, also in the forward gears 3, 4, 5, and 6. For the case in which the parking lock pawl 20 is disengaged, the parking lock detent 22 is actuated for locking in order to hold the parking lock system 19 or the parking lock pawl 20 in the disengaged position regardless of the pressure control for the shift element A.

According to example aspects of the invention, in an operating situation of the transmission 2, in which the shift element 9 of the transmission 2, which utilizes the common pressure control together with the parking lock actuator 21, e.g., the shift element A in the example shown in FIG. 1, is actuated with the aid of a pressure control effecting an at least partial engagement of the shift element 9, monitoring is carried out to determine whether, for the case in which this pressure control is less than a limiting value for holding the parking lock system 19 and, thereby, the parking lock pawl 20, due to the pressure control, in the disengaged position, the parking lock sensor 23 detects a movement of the parking lock actuator 21 or a signal corresponding to the movement of the parking lock actuator 21 despite the parking lock detent 22 having been actuated for locking.

For the case in which a movement of the parking lock actuator 21 or a signal corresponding to the movement of the parking lock actuator 21 is detected, a faulty parking lock detent 22 is inferred.

However, for the case in which no movement of the parking lock actuator 21 or no signal corresponding to the movement of the parking lock actuator 21 is detected, a non-faulty parking lock detent 22 is inferred.

Further details of example aspects of the invention are described in the following with reference to the timing diagrams from FIGS. 3, 4, 5, and 6, wherein multiple signal curves over the time t are shown in FIGS. 3 through 6.

A signal curve 25 shows a demanded gear position of the transmission 2, which can assume the gear selector positions P for parking, N for the neutral position, R for driving in the reverse direction of travel, and D for driving in the forward direction of travel.

A signal curve 26 visualizes a signal made available by the parking lock sensor 23, which can assume a condition I or a condition II or an intermediate condition therebetween. The condition I corresponds to an engaged parking lock. The condition II corresponds to a non-engaged or disengaged parking lock. A signal curve 27 corresponds to a signal curve of the parking lock detent 22, which is actuated for release in a condition III and for locking in a condition IV. A signal curve 28 corresponds to a check of the parking lock detent 22, wherein, in the condition 0 of the signal curve 28, a check of the parking lock detent 22 does not take place and, in the condition 1, a check of the parking lock detent 22 takes place.

Figure 3:
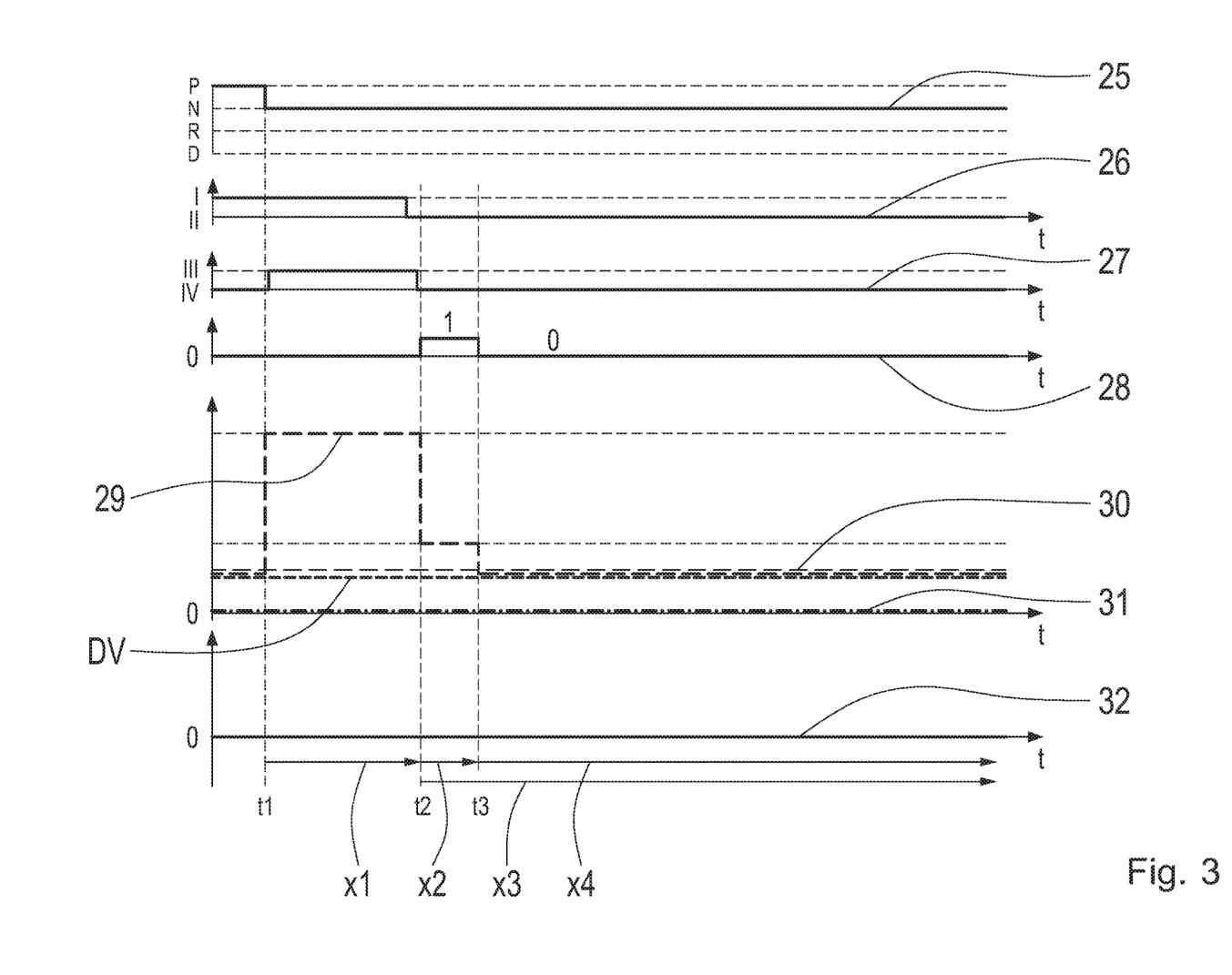
FIG. 3 shows a timing diagram for illustrating example aspects of the invention.

The signal curves 29, 30, and 31 visualize a pressure control of shift elements of the transmission 2. FIG. 3 shows that, at the point in time t1, the transmission 2 is to be transferred into the neutral position N starting from the park position P. In the park position P, while the motor vehicle is running, two shift elements of the transmission 2 are filled to a so-called charge pressure threshold, according to the signal curves 29 and 30, wherein, at the point in time t1, the pressure control 29 of a shift element and, in fact, that of the shift element A in FIG. 1, is increased, and, in fact, to such an extent that the parking lock system 19 can be disengaged via the level of the pressure control 29, which assumes the same level between the points in time t1 and t2. Between the points in time t1 and t2, therefore, a disengagement of the parking lock system 19 or of the parking lock pawl 20 thereof takes place via the pressure control 29 of the shift element A. The pressure control 29 is also utilized by the parking lock actuator 21, wherein the parking lock detent 22 is actuated for release between the points in time t1 and t2 according to the signal curve 27. Shortly before the point in time t2, according to the signal curve 26, the parking lock sensor 23 detects that the parking lock is disengaged, and so the parking lock detent 22 can also be actuated for locking, according to the condition IV, immediately before the point in time t2.

After the disengagement of the parking lock system 19 or the parking lock pawl 20 and the actuation of the parking lock detent 22 for locking, the pressure control for the shift element A and, therefore, also the pressure control for the parking lock actuator 21 is reduced according to the signal curve 29 and, in fact, between the points in time t2 and t3 to a pressure level that is less than a limiting value for holding the parking lock system 19 and, thereby, the parking lock pawl 20 in the disengaged position as a result of this pressure control. Rather, the pressure level of the common pressure control 29 selected between the points in time t2 and t3 is reduced to such an extent that, due to this pressure control, the parking lock actuator 21 can no longer be held in the disengaged position.

Starting at the point in time t2, for the case in which the parking lock detent 22 has been actuated for locking, the check of the parking lock detent 22 then takes place up to the point in time t3, wherein a check is carried out between the points in time t2 and t3 with the aid of the parking lock sensor 23 to determine whether a movement of the parking lock actuator 21 or a signal corresponding to the movement of the parking lock actuator 21 is present between the points in time t2 and t3.

If a movement of the parking lock actuator 21 or a signal corresponding to the movement of the parking lock actuator 21 is detected between the points in time t2 and t3 despite the parking lock detent 22 having been actuated for locking according to the signal curve 27, a faulty parking lock detent 22 is inferred.

However, for the case in which no movement of the parking lock actuator 21 or no signal corresponding to the movement of the parking lock actuator 21 is detected between the points in time t2 and t3, a non-faulty parking lock detent 22 is inferred.

The check of the parking lock detent 22 is concluded at the point in time t3. Since, subsequently, the transmission is to remain in the neutral position N according to the signal curve 25, the pressure control for the shift element A can be reduced again to the charge pressure threshold according to the signal curve 29.

FIG. 3 visualizes, with the aid of the signal curve 32, that no torque can be transmitted when the transmission is in the neutral position N. The arrow X1 from FIG. 3, which extends between the points in time t1 and t2, visualizes the disengagement of the parking lock system 19. The arrow X2 visualizes the check of the parking lock detent 22. The arrow X3 visualizes the interval in which this check is possible, in principle. Upon conclusion of the check at the point in time t3, the transmission is released for a shift sequence according to the arrow X4. A pressure level DV visualizes the level of the pressure control that is necessary at the shift element A in order to be able to transmit the torque presently to be transmitted, i.e., the pressure level of the pressure control at the shift element that utilizes a common pressure control together with the parking lock actuator 21.

Figure 4:
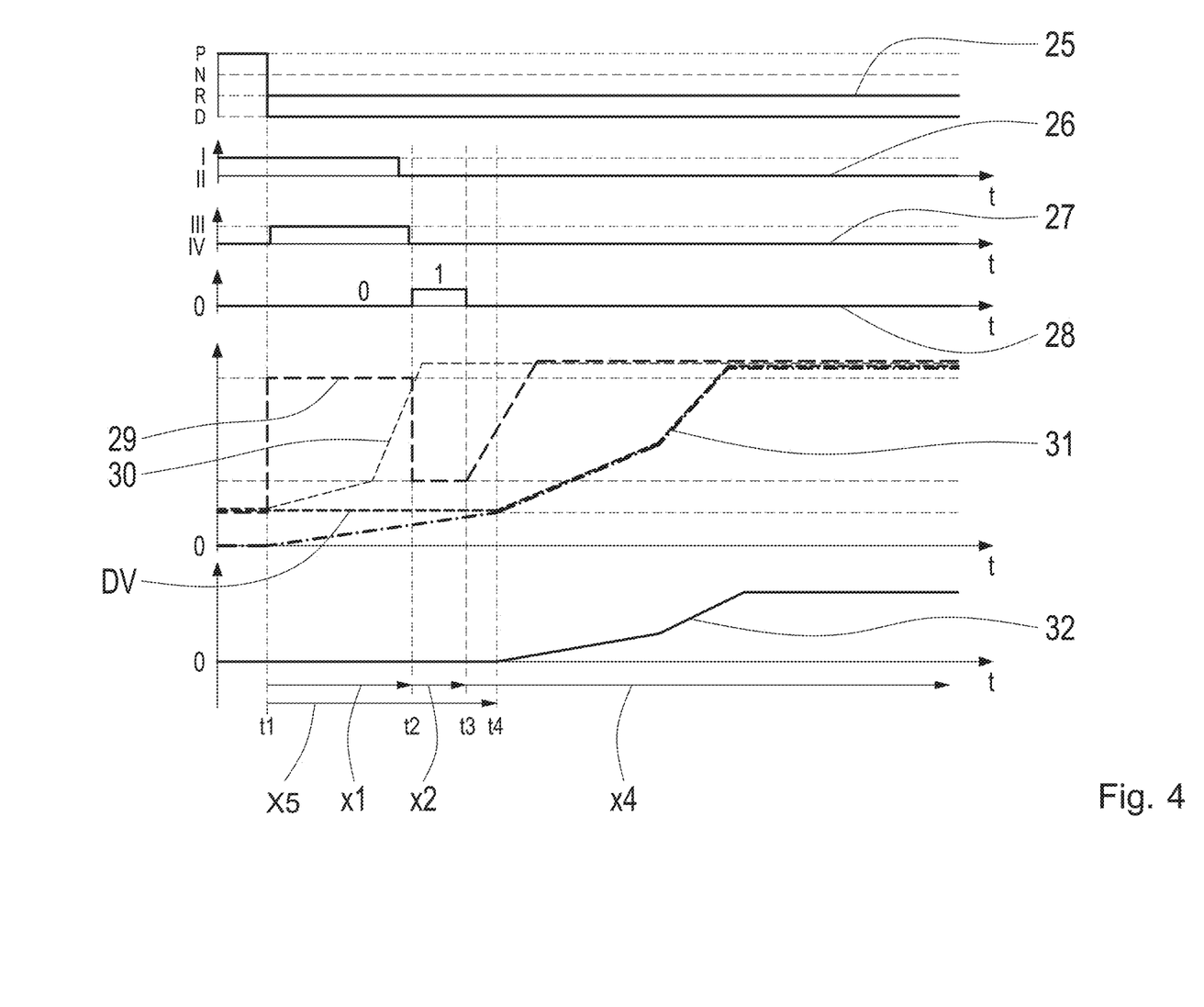
FIG. 4 shows a timing diagram for further illustrating example aspects of the invention.

FIG. 4 visualizes the aforementioned signal curves 25 through 32 for the case in which, at the point in time t1, the transmission in the park position P is to be transferred into the driving position R for travel in reverse or, alternatively, into the driving position D for forward travel. Therefore, according to the signal curve 29, not only is the shift element A, which utilizes the common pressure control together with the parking lock actuator 21, filled above the charge pressure level, but rather two further shift elements are as well, which are dependent on whether the reverse gear or one of the forward gears 1 or 2 is engaged in the transmission, according to the signal curves 30 and 31. At the point in time t4, the three shift elements are engaged with the aid of the pressure control 29, 30, and 31 to such an extent that torque can be transmitted to the driven end via the transmission at the point in time t4, according to the signal curve 32.

In FIG. 4 as well, the check of the parking lock detent 22 takes place between the points in time t2 and t3, i.e., after the disengagement of the parking lock via the level—set between the points in time t1 and t2—of the pressure control of the signal curve 29 and after the actuation of the parking lock detent 22 for locking between the points in time t2 and t3. For the purpose of the check, in conformance with FIG. 3 according to the signal curve 29, the level of the pressure control of the shift element A and, thereby, of the parking lock actuator 21 is reduced to a level that is less than the limiting value at which the parking lock system 19 and, thereby, the parking lock pawl 20 can be held in the disengaged position due to the pressure control.

If it is detected, due to the reduced pressure control and despite the actuation of the parking lock detent 22 for locking, that the parking lock actuator 21 moves, a faulty parking lock detent 22 is inferred. Otherwise, a non-faulty parking lock detent 22 is inferred. The arrows X1, X2, and X4 from FIG. 4 correspond to the arrows X1, X2, and X4 from FIG. 3. The arrow X5 from FIG. 4 illustrates the pressure control 31 of the shift element of the transmission that was most recently actuated in the sequence of the pressure controls, and with the aid of which the torque transmission is finally built up at the point in time t4.

Figure 5:
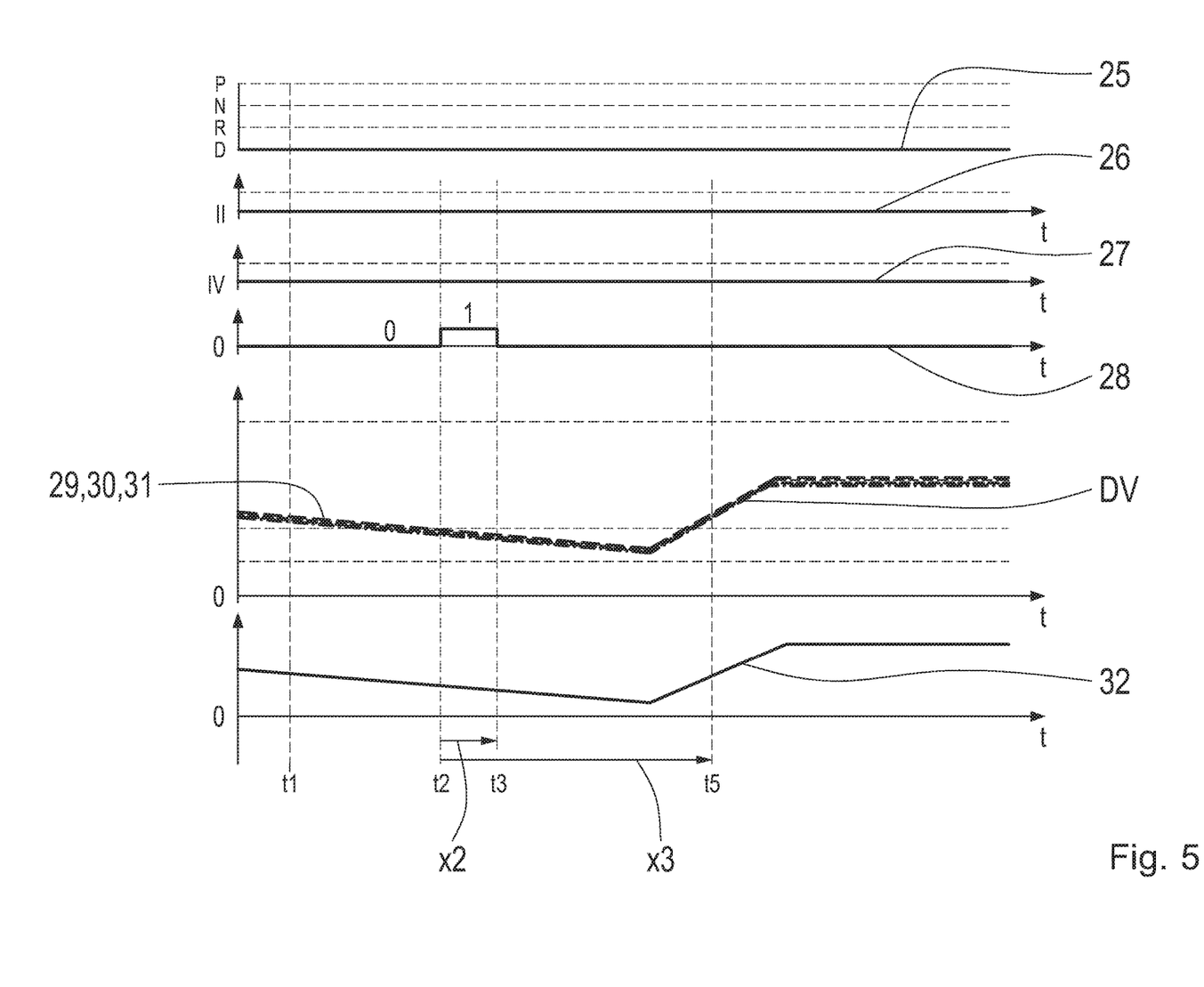
FIG. 5 shows a timing diagram for further illustrating example aspects of the invention.

FIG. 5 visualizes details of the method according to example aspects of the invention for the case in which the transmission 2 assumes a driving position D for forward travel and in which the transmission does not change at the point in time t1. Rather, the driving position D for forward travel is present in the transmission before the point in time t1 and after the point in time t1. Therefore, the signal curve 26 permanently assumes the condition II and the signal curve 27 permanently assumes the condition IV. The parking lock detent 22 is therefore permanently actuated for locking, in order to lock the disengaged parking lock actuator 22. The pressure control 29, 30, 31 for the engaged shift elements of the transmission is adapted depending on the torque to be transmitted. If the pressure control for the shift element that utilizes the common pressure control together with the parking lock actuator 21 drops, at the point in time t1, below the level of the limiting value at which the parking lock system 19 can no longer be held in the disengaged condition due to the pressure control, the check of the parking lock detent 22 can be carried out starting at the point in time t2.

According to the signal curves 29, 30, 31, and 32 from FIG. 5, the pressure control of the engaged shift elements in the transmission 2 is according to demand. Therefore, the shift elements are always actuated only with a pressure that is necessary in order to be able to transmit the torque actually to be transmitted. The torque to be transmitted corresponds to the transmittable torque of the signal curve 32.

If the level of the pressure control of the shift elements drops below the limiting value, the parking lock system 19 can no longer be held in the disengaged position due to the pressure control, and so the check of the parking lock detent 22 takes place as described above between the points in time t2 and t3 in FIG. 5. This check is possible, in principle, up to the point in time t5, which is visualized with the aid of the arrow X3.

In FIGS. 4 and 5, the check of the parking lock detent 22 preferably takes place for the case in which, in the driving position D for forward travel, the forward gear 1 or the forward gear 2 is to be engaged (FIG. 4) or has been engaged (FIG. 5).

Figure 6:
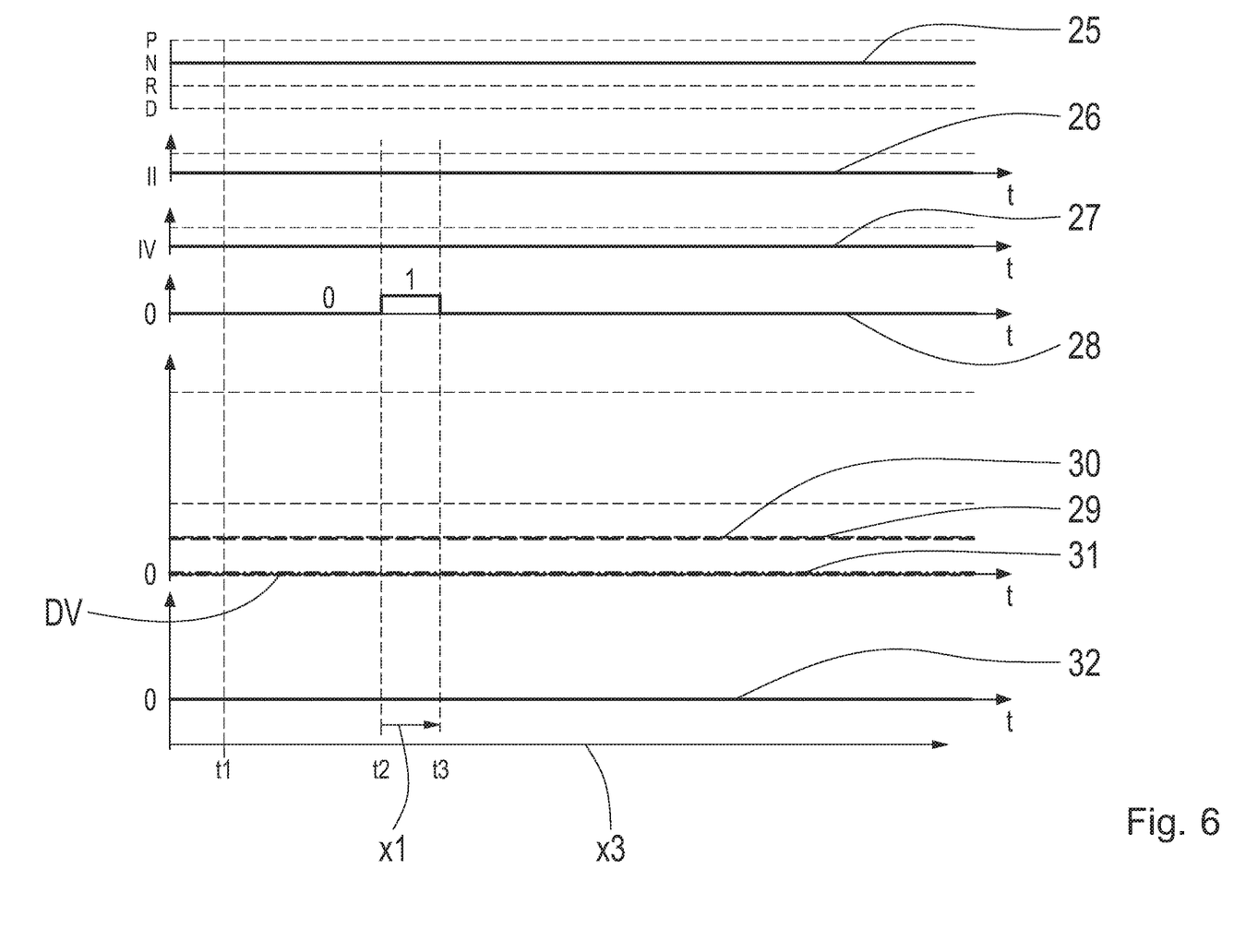
FIG. 6 shows a timing diagram for further illustrating example aspects of the invention.

FIG. 6 shows the above-described curve profiles 25 through 32 for the case in which the neutral position N has already been selected in the transmission before the point in time t1. In this case, according to the signal curves 29 and 30, two shift elements are then filled up to the charge pressure level and, in fact, also the shift element that utilizes the common pressure control together with the parking lock actuator 21. In FIG. 6, the pressure control 29 is held at a level, for the entire time, which is below the limiting value, i.e., is too low to hold the parking lock system in the disengaged position due to the pressure control. Therefore, according to the arrow X3, the check can take place over the entire time from FIG. 6. This check actually takes place between the points in time t2 and t3. In this case, monitoring is carried out to determine whether, despite the parking lock detent 22 having been actuated for locking (see signal curve 27) due to the pressure control of the signal curve 29, the parking lock sensor 23 detects a movement of the parking lock actuator 21 or a signal corresponding to the movement of the parking lock actuator 21. Depending thereon, a faulty or non-faulty parking lock detent 22 is inferred.

The check of the parking lock detent 22 takes place according example aspects to the invention in the disengaged and actuated-for-locking condition of the parking lock or of the parking lock system 19. The transmission of the torque present at the shift element 9, which utilizes the common pressure control together with the parking lock actuator, 21, is not imperiled by example aspects the invention.

Example aspects the invention also relate to a control unit, which is configured for carrying out the above-described method on the control side. This is, in particular, the transmission control unit of the transmission 2.

In the operating situation of the transmission, in which the control unit actuates the shift element of the transmission 2, which utilizes the common pressure control together with the parking lock actuator 21, with a pressure control that effects an at least partial engagement of the shift element and is less than the limiting value for holding the parking lock system 19 in the disengaged position due to this pressure control, the transmission control unit carries out monitoring to determine whether a movement of the parking lock actuator 21 is present despite the parking lock detent having been actuated for locking.

Depending thereon, the control unit then infers either a faulty parking lock detent 22 or a non-faulty parking lock detent 22.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 prime mover
2 automatic transmission
3 gear set
4 gear set
5 gear set
6 gear set
7 transmission input shaft
8 transmission output shaft
9 shift element A
10 shift element B
11 shift element C
12 shift element D
13 shift element E
14 driven end
15 torque converter
16 turbine
17 pump
18 torque converter lockup clutch
19 parking lock system
20 parking lock pawl
21 parking lock actuator
22 parking lock detent
23 parking lock sensor
24 hydraulic system
25 gear position signal curve
26 parking lock sensor signal curve
27 parking lock detent signal curve
28 check signal curve
29 shift element pressure control signal curve
30 shift element pressure control signal curve
31 shift element pressure control signal curve
32 transmittable torque signal curve

The invention claimed is:

1. A method for operating a motor vehicle that includes a prime mover (1), a multi-stage transmission (2) with multiple shift elements (9, 10, 11, 12, 13), a driven end (14), and a parking lock system (19), the transmission (2) is arranged in power flow between the prime mover (1) and the driven end (14), a first number of the shift elements is engaged and a second number of the shift elements is disengaged with the aid of an appropriate pressure control of the shift elements (9, 10, 11, 12, 13) in each force-locking gear of the transmission (2), the parking lock system (19) includes a parking lock actuator (21) actuating a parking lock pawl (20), a parking lock detent (22), and a parking lock sensor (23), one of the shift elements (9) of the transmission (2) and the parking lock actuator (21) utilize a common pressure control such that the pressure control of the one shift element (9) also actuates the parking lock actuator (21) in order to disengage the parking lock pawl (20), the method comprising:

in an operating situation of the transmission (2) in which the one shift element (9) of the transmission (2) is actuated with the pressure control to affect an at least partial engagement of the one shift element (9) and when the pressure control is less than a limiting value for holding the parking lock system (19) in the disengaged position, monitoring the parking lock sensor (23) to determine whether the parking lock sensor (23) detects a movement of the parking lock actuator (21) or a signal corresponding to the movement of the parking lock actuator (21) despite the parking lock detent (22) having been actuated for locking; and when the movement of the parking lock actuator (21) or the signal corresponding to the movement of the parking lock actuator (21) is detected, inferring a faulty parking lock detent (22), or when no movement of the parking lock actuator (21) or no signal corresponding to the movement of the parking lock actuator (21) is detected, inferring a non-faulty parking lock detent (22).

2. The method of claim 1, wherein, when the transmission (2) is transferred from a park position with an engaged parking lock system (19) into a neutral position or a driving position for forward travel or travel in reverse:

initially actuating the one shift element (9) of the transmission (2) with the pressure control that at least partially engages the one shift element (9) and disengages the parking lock system (19);

thereafter, when the parking lock system (19) is disengaged and the parking lock detent (22) is actuated for locking, reducing the pressure control such that the parking lock system (19) is no longer holdable in the disengaged position due to the reduced pressure control; and the monitoring of the parking lock sensor (23) comprises monitoring the parking lock sensor (23) to determine whether, despite the parking lock detent (22) having been actuated for locking due to the reduced pressure control, the parking lock sensor (23) detects the movement of the parking lock actuator (21) or the signal corresponding to the movement of the parking lock actuator (21).

3. The method of claim 2, wherein:

thereafter, when the parking lock system (19) is disengaged and the parking lock detent (22) is actuated for locking, reducing the pressure control such that the parking lock system (19) is no longer holdable in the disengaged position due to the reduced pressure control but is holdable in an intermediate position between the disengaged position and the engaged position.

4. The method of claim 2, wherein the reduced pressure control is greater than a pressure control required for a transmission of a required torque presently to be transmitted.

5. The method of claim 1, wherein, when the transmission (2) assumes a neutral position:

actuating the one shift element (9) of the transmission (2) with the pressure control that at least partially engages the one shift element (9) but at which the parking lock system (19) is not holdable in the disengaged position; and the monitoring of the parking lock sensor (23) includes monitoring the parking lock sensor (23) to determine whether, despite the parking lock detent (22) having been actuated for locking due to the pressure control, the parking lock sensor (23) detects the movement of the parking lock actuator (21) or the signal corresponding to the movement of the parking lock actuator (21).

6. The method of claim 1, wherein, when the transmission (2) assumes a driving position for forward travel or travel in reverse:

actuating the one shift element of the transmission (2) together with further shift elements of the transmission (2) with a particular pressure control that is required for a transmission of a required torque presently to be transmitted; and when the particular pressure control is less than the limiting value, the monitoring of the parking lock sensor (23) includes monitoring the parking lock sensor (23) to determine whether, despite the parking lock detent (22) having been actuated for locking due to the particular pressure control, the parking lock sensor (23) detects the movement of the parking lock actuator (21) or the signal corresponding to the movement of the parking lock actuator (21).

7. A control unit configured for implementing the method of claim 1 on a control side.

8. A control unit for operating a motor vehicle that includes a prime mover (1), a multi-stage transmission (2) with multiple shift elements (9, 10, 11, 12, 13), a driven end (14), and a parking lock system (19), the transmission (2) is arranged in power flow between the prime mover (1) and the driven end (14), a first number of the shift elements is engaged and a second number of the shift elements is disengaged with the aid of an appropriate pressure control of the shift elements (9, 10, 11, 12, 13) in each force-locking gear of the transmission (2), the parking lock system (19) includes a parking lock actuator (21) actuating a parking lock pawl (20), a parking lock detent (22), and a parking lock sensor (23), one of the shift elements (9) of the transmission (2) and the parking lock actuator (21) utilize a common pressure control such that the pressure control of the one shift element (9) also actuates the parking lock actuator (21) in order to disengage the parking lock pawl (20), the control unit configured for:

in an operating situation of the transmission (2) in which the one shift element (9) of the transmission (2) is actuated with the pressure control to affect an at least partial engagement of the one shift element (9) and when the pressure control is less than a limiting value for holding the parking lock system (19) in the disengaged position, monitoring the parking lock sensor (23) to determine whether the parking lock sensor (23) detects a movement of the parking lock actuator (21) or a signal corresponding to the movement of the parking lock actuator (21) despite the parking lock detent (22) having been actuated for locking; and when the movement of the parking lock actuator (21) or the signal corresponding to the movement of the parking lock actuator (21) is detected, inferring a faulty parking lock detent (22), or when no movement of the parking lock actuator (21) or no signal corresponding to the movement of the parking lock actuator (21) is detected, inferring a non-faulty parking lock detent (22).

* * * * *